United States Patent
Chung et al.

(10) Patent No.: US 9,460,043 B2
(45) Date of Patent: Oct. 4, 2016

(54) FLASH DRIVE WITH TRANSFORMING MECHANISM

(71) Applicant: PHISON ELECTRONICS CORP., Miaoli (TW)

(72) Inventors: Hung-I Chung, Hsinchu County (TW); Chang-Chih Chen, Hsinchu County (TW); Wei-Hung Lin, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 350 days.

(21) Appl. No.: 13/950,286

(22) Filed: Jul. 25, 2013

(65) Prior Publication Data
US 2014/0337555 A1 Nov. 13, 2014

(30) Foreign Application Priority Data
May 13, 2013 (TW) .............................. 102116931 A

(51) Int. Cl.
*G06F 3/00* (2006.01)
*G06F 13/40* (2006.01)

(52) U.S. Cl.
CPC ................................ *G06F 13/4081* (2013.01)

(58) Field of Classification Search
CPC ... G06F 13/385; G06F 13/387; G06F 3/0661
USPC ........................................................ 710/301
See application file for complete search history.

(56) References Cited

U.S. PATENT DOCUMENTS

| 6,658,516 B2* | 12/2003 | Yao ................................ 710/301 |
| 6,733,329 B2* | 5/2004 | Yang .............................. 439/518 |
| 7,749,028 B2* | 7/2010 | Iranpour Feridani et al. .............................. 439/660 |
| 8,043,099 B1* | 10/2011 | Ni et al. ........................ 439/131 |
| 2003/0211784 A1* | 11/2003 | Wu ...................... H01R 31/065 439/638 |
| 2010/0330828 A1* | 12/2010 | Tang et al. .................... 439/131 |

FOREIGN PATENT DOCUMENTS

| CN | 201247595 | 5/2009 |
| CN | 202549304 | 11/2012 |

OTHER PUBLICATIONS

"Office Action of China Counterpart Application", issued on Jun. 1, 2016, p. 1-p. 10, in which the listed references were cited.

* cited by examiner

*Primary Examiner* — Titus Wong
(74) *Attorney, Agent, or Firm* — Jianq Chyun IP Office

(57) ABSTRACT

A flash drive includes a storage module, a switching module, and a transforming mechanism. The storage module has a storage unit and a first interface electrically connected to each other. The switching module has a second interface and a third interface which are in different types but are electrically connected to each other, and the first interface corresponds to the second interface. The transforming mechanism is located at a first position or a second position relative to the storage module, and the switching module is located in the transforming mechanism. When the transforming mechanism is located at the first position, the first interface is electrically connected to the second interface, so that the storage unit is electrically connected to a host through the third interface. When the transforming mechanism is located at the second position, the first interface of the storage unit is electrically connected to the host.

11 Claims, 5 Drawing Sheets

FLASH DRIVE WITH TRANSFORMING MECHANISM

CROSS-REFERENCE TO RELATED APPLICATION

This application claims the priority benefit of Taiwan application serial no. 102116931, filed on May 13, 2013. The entirety of the above-mentioned patent application is hereby incorporated by reference herein and made a part of this specification.

BACKGROUND

1. Technology Field

The invention relates to a flash drive. More particularly, the invention relates to a flash drive with different switching interfaces.

2. Description of Related Art

With the development of multimedia technology, storage capacity required by digital data becomes larger and larger, and a conventional 1.44 MB floppy disk characterized by portability is thus no longer able to meet the requirement for large storage capacity. Although a conventional hard disk provides large storage capacity, the bulkiness of the conventional hard disk causes inconvenience to users. Recently, with the popularization of the universal serial bus (USB) interface and the price reduction of the flash memories, USB flash advantaged in large storage capacity, great compatibility, and portability have been extensively applied to transmit data between various computers and storage devices.

The flash drive featuring large storage capacity, plug-and-play installation, compact size, and portability has replaced the floppy disk. Note that the flash drive is electrically connected to a computer host and a storage device through a connector (e.g., a USB plug or an IEEE 1394 plug).

Due to various types of connectors applicable to the existing electronic devices, researchers and manufacturers skilled in the pertinent art should be dedicated to enhancement of the possibility for extending applicability of the flash drive.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention provides a flash drive equipped with different switching interface connectors.

In an exemplary embodiment of the invention, a flash drive that includes a storage module, a switching module, and a transforming mechanism is provided. The storage module has a storage unit and a first interface which are electrically connected to each other. The switching module has a second interface and a third interface. The second interface and the third interface are in different types but are electrically connected to each other, and the first interface corresponds to the second interface. The transforming mechanism is located at a first position or a second position relative to the storage module, and the switching module is located in the transforming mechanism. When the transforming mechanism is located at the first position, the first interface and the second interface are electrically connected to each other, such that the storage module is electrically connected to a host through the third interface. When the transforming mechanism is located at the second position, the first interface of the storage module is electrically connected to the host.

As is discussed above, in the flash drive described in the previous exemplary embodiment of the invention, the state changes to the transforming mechanism and the storage module allow the storage module to employ the first interface as its transmission interface; what is more, since the switching module located in the transforming mechanism is connected to the first interface, the storage module may also select the third interface to be its transmission interface.

It should be understood, however, that this Summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
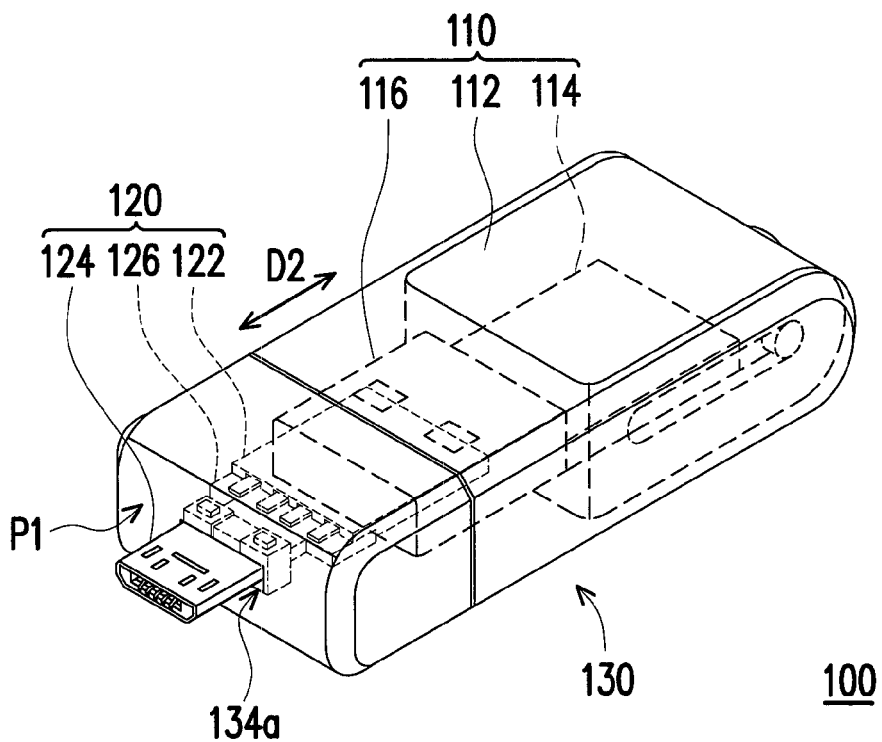
FIG. 1 is a schematic diagram illustrating a flash drive according to an exemplary embodiment of the invention.

Reference will now be made in detail to the present exemplary embodiments of the invention, examples of which are illustrated in the accompanying drawings. Wherever possible, the same reference numbers are used in the drawings and the description to refer to the same or like parts. Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. It is to be noted that the term "a" or "an" entity refers to one or more of that entity. As such, the terms "a" (or "an"), "one or more," and "at least one" can be used interchangeably herein.

Figure 2:
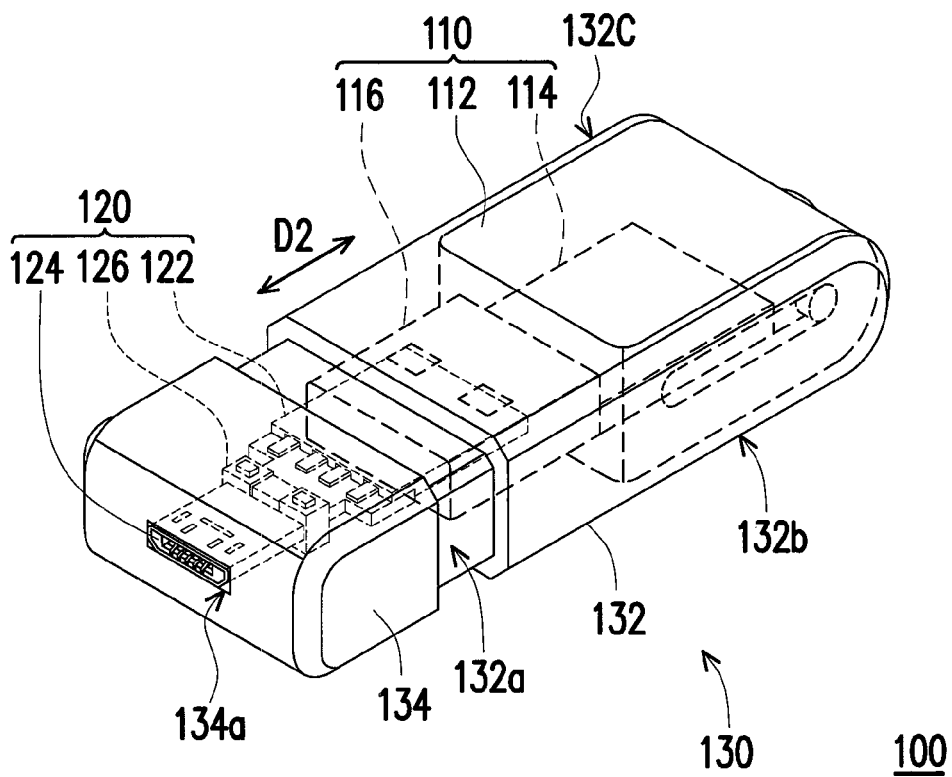
FIG. 2 to FIG. 4 schematically illustrate a process during which the flash drive depicted in FIG. 1 is changed to be in another state.
Figure 3:
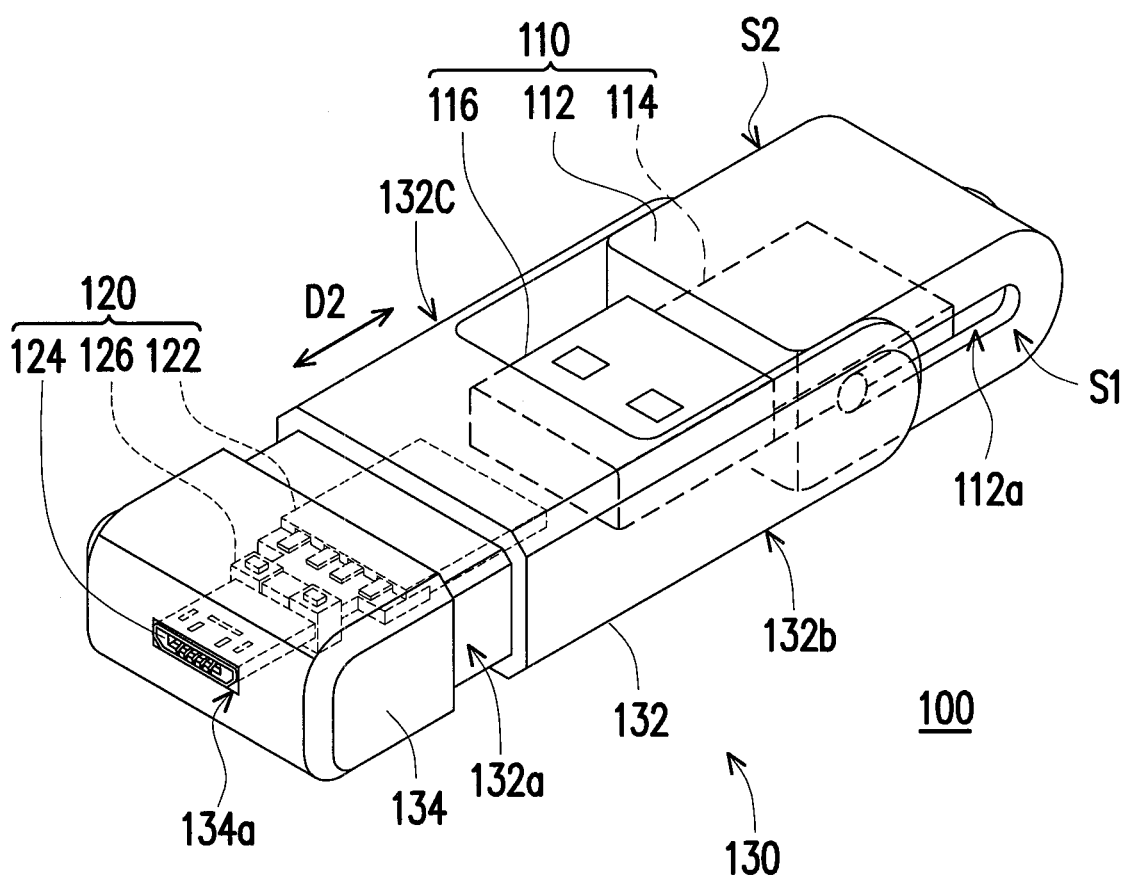
Figure 4:
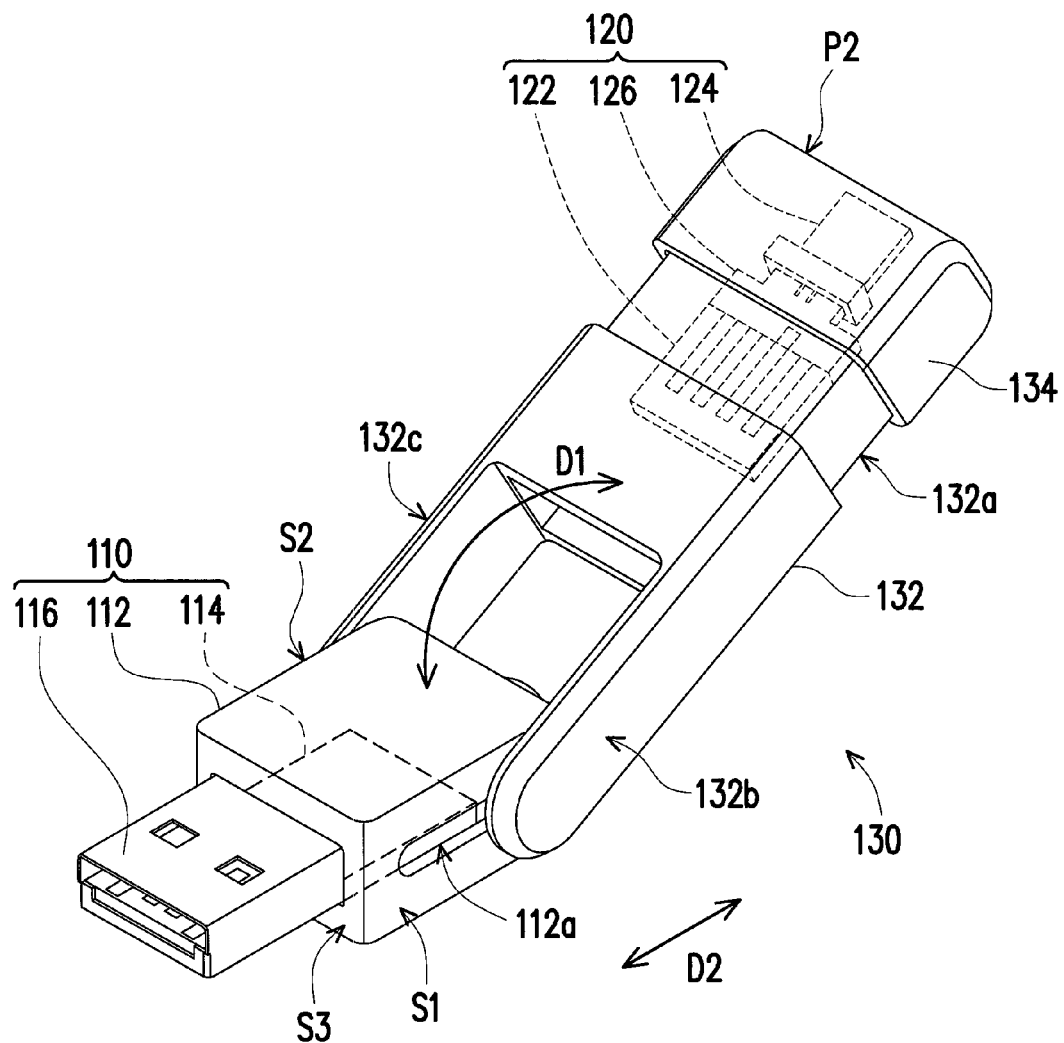

FIG. 1 is a schematic diagram illustrating a flash drive according to an exemplary embodiment of the invention. FIG. 2 to FIG. 4 schematically illustrate a process during which the flash drive depicted in FIG. 1 is changed to be in another state. To better understand the correlations of relevant components, the components within the flash drive are partially illustrated by dotted lines. With reference to FIG. 1 to FIG. 4, in the present exemplary embodiment, the flash drive 100 includes a storage module 110, a switching module 120, and a transforming mechanism 130. The storage module 110 may be considered as the main component of the flash drive 100 and has a first body 112, a storage unit 114, and a first interface 116. The storage unit 114, for instance, is a flash memory storage unit. In addition, a system in package (SIP) technology is employed to construct various types of electronic elements, such as control devices, storage devices, and a circuit board (not shown herein) into a systematic integrated package by use of plastic, metal, ceramics material, or epoxy resin, so as to protect the electronic elements in the package structure. The first interface 116 is electrically connected to the storage unit 114 and protrudes from the first body 112, so that the storage unit 114 of the storage module 110 may employ the first interface 116 as its transmission interface and may thereby be connected to other electronic devices.

The switching module 120 has a second interface 122 and a third interface 124. The second interface 122 and the third interface 124 are in different types but are electrically connected to each other, and the first interface 116 of the storage module 110 corresponds to the second interface 122. The corresponding correlation herein refers to the structural and electrical connection between the two interfaces. The transforming mechanism 130 is movably assembled to the storage module 110, and the switching module 120 is located in the transforming mechanism 130. Thereby, when the transforming mechanism 130 assembled to the storage module 110 rotates by a proper angle to a first position P1 (shown in FIG. 1), the first interface 116 is allowed to correspondingly connect with the second interface 122, such that the storage unit 114 is electrically connected to the third interface 124 through the second interface 122. Hence, the storage unit 114 may employ the third interface 124 as its transmission interface by which the storage unit 114 may be connected to the hosts of other electronic devices. By contrast, when the switching module 120 is moved away from the first interface 116 of the storage module 110 through the transforming mechanism 130 and arrives at a second position P2 (shown in FIG. 4), the storage unit 114 again employs the first interface 116 as its transmission interface. By means of the movement of the transforming mechanism 130, the storage module 110 is allowed to employ different transmission interfaces. For instance, as discussed above, the storage module 110 may select between the first interface 116 and the third interface 124.

In the present exemplary embodiment, the first interface 116 and the third interface 124 are respectively a plug, and the second interface 122 is a socket. Particularly, in the present exemplary embodiment, the first interface 116 is a USB plug, the second interface 122 is a USB socket, and the third interface 124 is the micro-USB plug. The first interface 116 is electrically connected to the storage unit 114 through performing a packaging or welding process, such that the storage unit 110 can be operated as the storage unit 110 is in the first state (as shown in FIG. 4). When the transforming mechanism 130 is connected to the storage module 110 in the manner sequentially shown in FIG. 4, FIG. 3, and FIG. 2, the second interface 122 of the switching module 120 in the transforming mechanism 130 is correspondingly connected to the first interface 116. Therefore, the storage unit 114 is allowed to employ the third interface 124 (i.e., the micro-USB plug) as its transmission interface when the storage unit 114 is in the second state (as shown in FIG. 1).

With reference to FIG. 4, in the present exemplary embodiment, the first body 112 has a rectangular structure and is equipped with a pair of sliding grooves 112a located on a pair of side surfaces S1 and S2 of the first body 112, respectively. The first interface 116 protrudes from a front surface S3 of the first body 112, and the front surface S3 neighbors with and is connected between the pair of side surfaces S1 and S2. The transforming mechanism 130 includes a second body 132 and a cover 134. The second body 132 has a lip portion 132a and a pair of extension arms 132b and 132c, and the lip portion 132a and the extension arms 132b and 132c are extended toward opposite directions. The cover 134 is slidably mounted to the lip portion 132a of the second body 132. An end of each of extension arms 132b and 132c away from the lip portion 132a is slidably pivoted to a corresponding sliding groove 112a of the first body 112. In the present exemplary embodiment, only one of the sliding grooves 112a on one side of the first body 112 is exemplarily depicted in the drawings.

With reference to FIG. 1 to FIG. 4, by means of the extension arms 132b and 132c and the sliding grooves 112a, the second body 132 is able to rotate relative to the storage module 110 along the direction D1 and slide along the direction D2 in a back-and-forth manner. When the second body 132 rotates to the position shown in FIG. 3, the second body 132 may further slide along the direction D2, such that the second body 132 and the first body 112 are mounted to each other, and that the extension arms 132b and 132c completely cover the side surfaces S1 and S2, respectively. Thereby, the second body 132 and the first body 112 are integrated into one single rectangle, as shown in FIG. 2; that is, the second body 132 herein is structurally derived from the first body 112. By contrast, when the first interface 116 is not yet connected to the second interface 122, the first body 112, the second body 132, and the extension arms 132b and 132c together form an encircled structure with opposite (up-and-down) openings (as shown in FIG. 3 and FIG. 4).

In addition, the cover 134 and the lip portion 132a are slidably mounted to each other, so as to switch between an extension state (as shown in FIG. 2 or FIG. 3) and a shrinkage state (as shown in FIG. 1). The cover 134 has an opening 134a. When the second body 132 is mounted to the first body 112, i.e., when the second interface 122 of the switching module 120 is connected to the first interface 116, the opening 134a faces the third interface 124 in the second body 132. When the cover 134 slides toward the extension arms 132b and 132c along the direction D2 to cover the lip portion 132a, the third interface 124 passes through the opening 134a and protrudes from the cover 134. At this time, the transforming mechanism 130 is moved to the first position P1 relative to the storage module 110, such that the first body 112, the second body 132, and the cover 134 together form a shell structure. The protruding third interface 124 then serves as the transmission interface of the flash drive 100 and is electrically connected to the host of any other electronic device.

In contrast thereto, if it is intended to again employ the first interface 116 as the transmission interface of the flash drive 100, the cover 134 may slide away from the extension arms 132b and 132c along the direction D2, and the second body 132 is then driven to slide away from the first body 112 along the direction D2, the second interface 122 may be decoupled from the first interface 116. After that, the second body 132 is rotated along the direction D1 to the second position P2, such that the first interface 116 may be exposed and used again.

Figure 5:
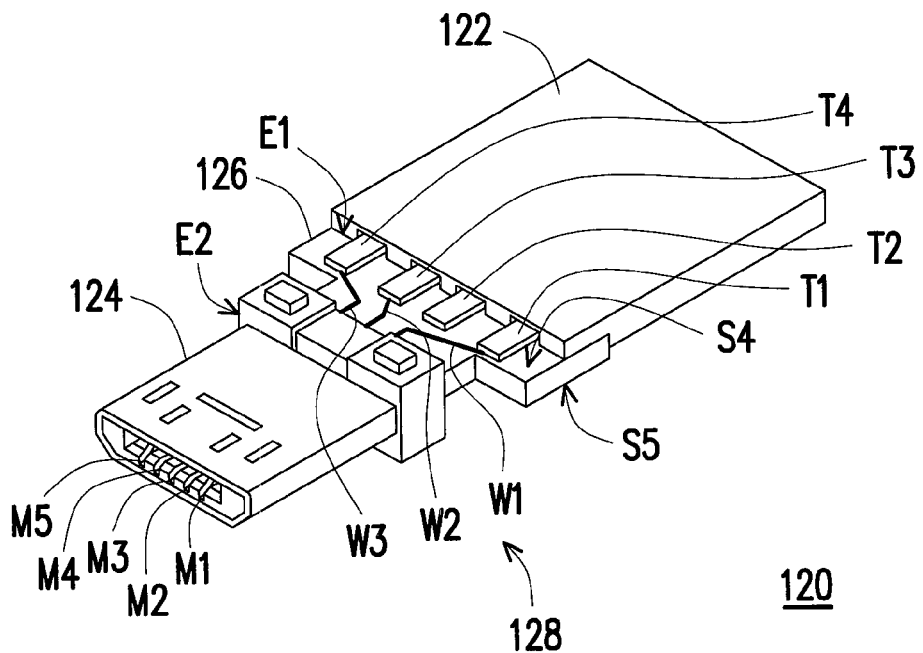
FIG. 5 and FIG. 6 are schematic diagrams illustrating a switching module in the flash drive depicted in FIG. 1 at different viewing angles.
Figure 6:
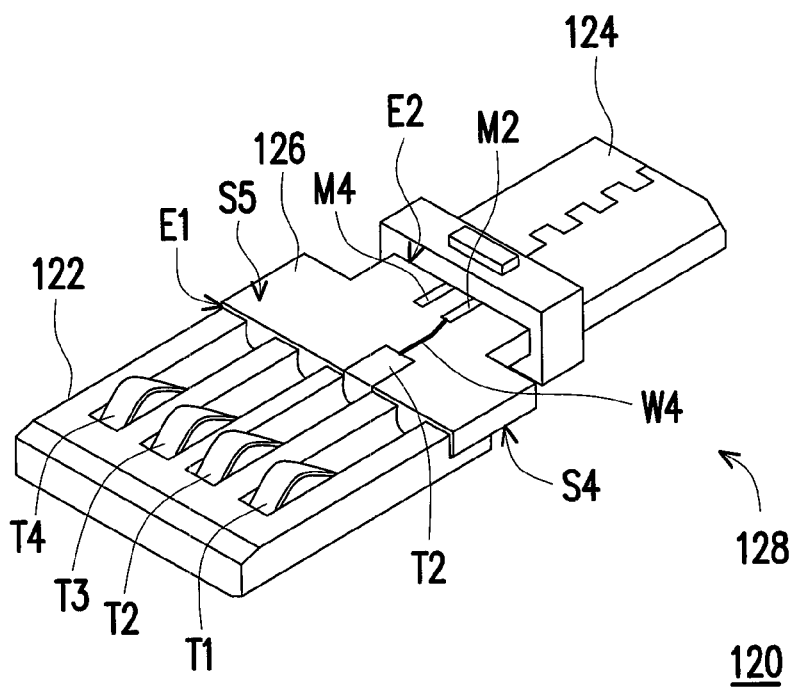

FIG. 5 and FIG. 6 are schematic diagrams illustrating a switching module in the flash drive depicted in FIG. 1 at different viewing angles. With reference to FIG. 5 and FIG. 6, the switching module 120 described in the present exemplary embodiment further includes a third body 126 and a connection circuit 128. The third body 126 has a first end E1 and a second end E2 opposite to each other, the second interface 122 is located at the first end E1, and the third interface 124 is located at the second end E2. The connection circuit 128 is located on the third body 126 and electrically connected between the second interface 122 and the third interface 124.

The third body 126 also has a first surface S4 and a second surface S5 facing against each other. The second interface 122 includes terminals T1 to T4, and the third interface 124 includes terminals M1 to M5. For instance, in the present exemplary embodiment, the terminals T1 to T4 are power terminal (VBUS) complying with the USB standard, differential signal terminals (D+/D−), and ground terminal (GND), while the terminals M1 to M5 are power terminal (VBUS) complying with the USB standard, differential signal terminals (D+/D−), identification terminal (ID), and ground terminal (GND).

The connection circuit 128 includes a plurality of conductive lines W1 to W4 on the first surface S4 and the second surface S5. The conductive lines W1 to W3 on the first surface S4 are correspondingly connected to the terminals T1, T3, T4, M1, M3, and M5, and the conductive line W4 on the second surface S5 is correspondingly connected to the terminals T2 and M2. Thereby, the surface area of the third body 126 may be fully utilized for configuring the connection circuit 128, so as to miniaturize the flash drive 100. Besides, according to the present exemplary embodiment, the number of terminals of the second interface 122 is different from the number of terminals of the third interface 124, such that at least one of the terminals (e.g., the terminal T2) of the second interface 122 is not electrically connected to the third interface 124. Similarly, in another exemplary embodiment that is not shown, at least one of the terminals of the third interface is not electrically connected to the second interface.

Figure 7:
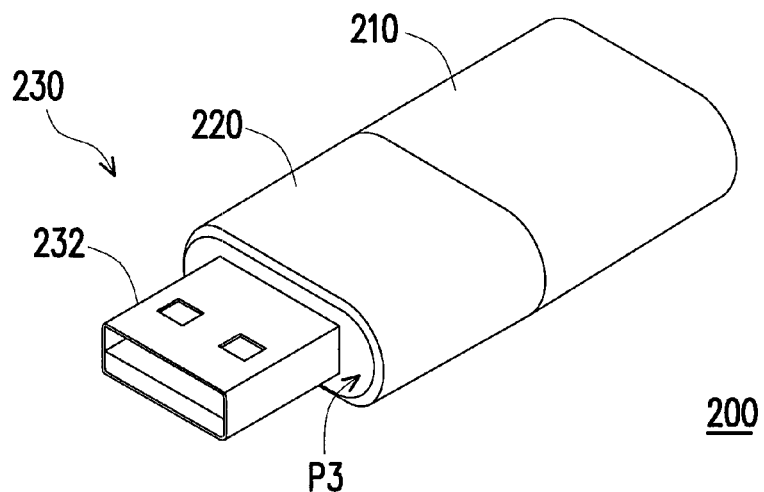
FIG. 7 to FIG. 9 are schematic diagrams illustrating a state change to a flash drive according to another exemplary embodiment of the invention.
Figure 8:
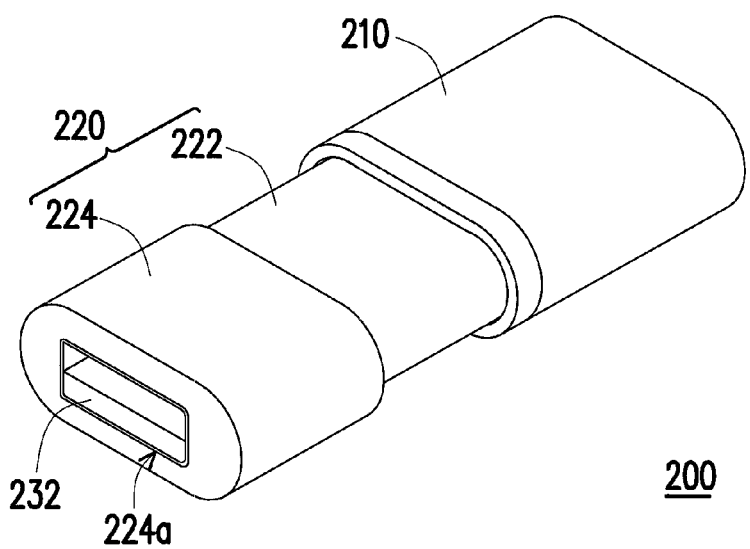
Figure 9:
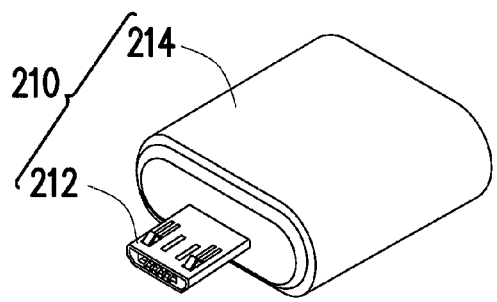

FIG. 7 to FIG. 9 are schematic diagrams illustrating a state change to a flash drive according to another exemplary embodiment of the invention. With reference to FIG. 7 to FIG. 9, the difference between the present exemplary embodiment and the previous embodiments lies in that the transforming mechanism 220 of the flash drive 200 is detachable, i.e., the transforming mechanism 220 is detachably assembled to the storage module 210. In particular, the transforming mechanism 220 includes a second body 222 and a cover 224. The second body 222 is detachably mounted to the first body 214 of the storage module 210, such that the first interface 212 is allowed to correspondingly connect the second interface (not shown) of the switching module 230. The cover 224 is slidably mounted to the second body 222, and the cover 224 has an opening 224a corresponding to the third interface 232. Therefore, when the cover 224 slides toward the first body 214 and covers the second body 222, the state of the flash drive 200 shown in FIG. 8 is changed to the state of the flash drive 200 shown in FIG. 7, and the transforming mechanism 220 is moved to the first position P3 relative to the storage module 210. Here, the third interface 232 protrudes from the cover 224 through the opening 224a, and thus the storage module 210 is allowed to employ the third interface 232 as its transmission interface and may be electrically connected to a host of any other electronic device. By contrast, as long as the transforming mechanism 220 is moved to the second position P2 relative to the storage module 210, i.e., the transforming mechanism 220 described herein is moved away from the storage module 210, the storage module 210 is allowed to employ the first interface 212 as its transmission interface and may be electrically connected to the host of any other electronic device.

The types of said interfaces are not limited herein. Namely, in the present exemplary embodiment, another interface different from the third interface 232 may serve as the output interface of the switching module, such that another type of the first interface 212 may act as the transmission interface.

To sum up, in the flash drive described in the previous exemplary embodiments of the invention, the state changes to the transforming mechanism and the storage module allow the storage module to employ the first interface as its transmission interface; what is more, since the switching module located in the transforming mechanism is connected to the first interface, the storage module may also select the third interface to be its transmission interface. By means of the transforming mechanism that may be assembled in a different manner or may be detachably assembled, the storage module is able to employ a corresponding transmission interface in response to different electronic devices, and thereby the application scope of the flash drive may be expanded.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A flash drive with transforming mechanism, comprising:
    a storage module having a storage unit and a first interface electrically connected to each other;
    a switching module having a second interface and a third interface, wherein the second interface and the third interface are in different types but are electrically connected to each other, and the first interface corresponds to the second interface; and
    a transforming mechanism located at a first position or a second position relative to the storage module, the switching module being located in the transforming mechanism, and the switching module being structurally connected to the storage module via the transforming mechanism, wherein
    when the transforming mechanism is located at the first position, the first interface and the second interface are electrically connected to each other, such that the storage module is configured to electrically connect to a host through the third interface, and
    when the transforming mechanism is located at the second position, the first interface of the storage module is configured to physically connect to the host, and the third interface is accommodated in the transforming mechanism.

2. The flash drive with transforming mechanism as recited in claim 1, wherein the storage module has a first body, the storage unit is located in the first body, and the first interface protrudes from the first body.

3. The flash drive with transforming mechanism as recited in claim 2, wherein the first body has a pair of sliding grooves, and the transforming mechanism comprises:

a second body having a lip portion and a pair of extension arms, the lip portion and the extension arms being extended toward opposite directions, the pair of extension arms being slidably pivoted to the pair of sliding grooves, and the transforming mechanism being moved between the first position and the second position by the pair of extension arms; and a cover slidably mounted to the lip portion, the cover covering or exposing the lip portion, the cover having an opening, a profile of the opening corresponding to the third interface, wherein when the cover slides toward the extension arms to cover the lip portion, the third interface passes through the opening and protrudes from the cover.

4. The flash drive with transforming mechanism as recited in claim 3, wherein the pair of sliding grooves is respectively located on a pair of side surfaces of the first body, the first interface protrudes from a front surface of the first body, and the front surface neighbors with and is connected between the pair of side surfaces.

5. The flash drive with transforming mechanism as recited in claim 2, wherein the transforming mechanism is detachable, and if the transforming mechanism is moved away from the storage module to the second position, the first interface is moved and decoupled from the second interface, such that the first interface acts as a transmission interface of the storage unit.

6. The flash drive with transforming mechanism as recited in claim 5, wherein the transforming mechanism comprises:
a second body detachably mounted to the first body; and
a cover slidably mounted to the second body, the cover covering or exposing the second body, the cover having an opening, a profile of the opening corresponding to the third interface, wherein when the cover slides relative to the second body to cover the second body, the third interface passes through the opening and protrudes from the cover.

7. The flash drive with transforming mechanism as recited in claim 1, wherein the transforming mechanism comprises:
a third body having a first end and a second end opposite to each other, the second interface being located at the first end, the third interface being located at the second end; and
a connection circuit located on the third body and electrically connected between the second interface and the third interface.

8. The flash drive with transforming mechanism as recited in claim 7, wherein the third body has a first surface and a second surface facing against each other, and the connection circuit comprises a plurality of conductive lines on the first surface and the second surface.

9. The flash drive with transforming mechanism as recited in claim 1, wherein the number of terminals of the second interface is different from the number of terminals of the third interface, such that at least one of the terminals of the second interface is not electrically connected to the third interface, or at least one of the terminals of the third interface is not electrically connected to the second interface.

10. The flash drive with transforming mechanism as recited in claim 1, wherein the first interface and the third interface are respectively a plug, and the second interface is a socket.

11. The flash drive with transforming mechanism as recited in claim 1, wherein the first interface is a universal serial bus plug or a micro-universal serial bus plug, the second interface is a universal serial bus socket or a micro-universal serial bus socket, and the third interface is the micro-universal serial bus plug or the universal serial bus plug.

* * * * *